3,294,803
1-AMINOALKYLAMINO-4-HYDROXYMETHYL (OR 4-FORMYL)-THIOXANTHENE DERIVATIVES
David Rosi, East Green Bush, N.Y., and George P. Peruzzotti, Madison, Wis., assignors to Sterling Drug Inc., New York, N.Y., a corporation of Delaware
No Drawing. Filed June 14, 1965, Ser. No. 463,908
Claims priority, application Great Britain, Aug. 24, 1964, 34,612/64
14 Claims. (Cl. 260—293.4)

This invention relates to compositions of matter of the class of substituted thioxanthenes and xanthenes, and to their preparation.

This application is a continuation-in-part of our copending application Serial Number 307,374, filed September 9, 1963, now abandoned.

The invention sought to be patented, in its composition aspect, resides in the class of compounds which we depict as having a molecular configuration in which hydroxymethyl or formyl is attached to the 4-carbon atom of a thioxanthene, a thioxanthene-S-oxide or -dioxide, a xanthene, and 9-one or 9-ol derivatives thereof, having attached to the 1-carbon atom thereof a (lower-secondary- or -tertiary -amino) - (polycarbon - lower- alkyl) amino substituent, and to an enzymatic oxidative process using the corresponding 4-methyl compounds as intermediates.

The corresponding 4-methyl compounds are well known as schistosomicidal agents. Illustrative of these compounds are 1 - (2 - diethylaminoethylamino) - 4 - methylthio-zanthen-9-one ("Miracil D") and 1-(2-diethylaminoethylamino) - 4 - methylxanthen - 9 - one ("Miracil A"). It has been found that the schistosomicidal activity of these illustrative compounds is retained and sometimes improved by varying the basic side chain substituent at the 1-position, by adding other ring substituents, by replacing the 9-one or 9-keto group ($>C=O$) by 9-ol ($>CHOH$) or by methylene ($>CH_2$), or by converting the 10-S of the thioxanthene to its oxide or dioxide derivative. On the other hand, all attempts to replace the 4-methyl group by other substituents have resulted in a complete loss of schistosomicidal effect.

We have now found that compounds of this type where 4-methyl is replaced by 4-hydroxymethyl or 4-formyl are highly active schistosomicidal agents, the 4-hydroxymethyl compounds being more active and less toxic than their 4-methyl precursors and the 4-formyl compounds having activity comparable to that of the precursors.

Without limiting the generality of the foregoing, illustrative and preferred embodiments of the composition aspect of our invention are represented by the Formula I

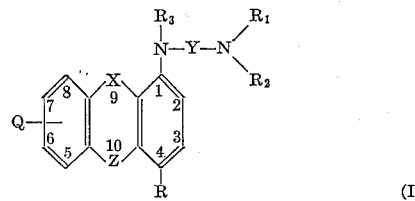

(I)

where X is carbonyl ($>C=O$), hydroxymethylene ($>CHOH$) or methylene ($>CH_2$), Z is —O—, —S—, $>SO$ or $>SO_2$, Q is hydrogen or from one to two substituents at positions 5, 6, 7 and 8 of the tricyclic ring selected from halo, lower-alkyl or lower-alkoxy, R is hydroxymethyl (—$CH_2OH$) or formyl (—CHO), Y is lower-alkylene having from two to four carbon atoms and having its two connecting linkages on different carbon atoms, $R_3$ is hydrogen or lower-alkyl, $R_1$ is hydrogen, lower-alkyl or lower-2-hydroxyalkyl and $R_2$ is lower-alkyl or lower-2-hydroxyalkyl, and where $R_1$ and $R_2$ taken with N, i.e., $NR_1R_2$, comprehends saturated N-heteromonocyclic radicals having five to six ring atoms, illustrated by piperidino, hexamethyleneimino, pyrrolidino, morpholino, piperazino and lower-alkylated derivatives thereof.

Also comprehended by our invention are the 5,6,7,8-tetrahydro derivatives of Formula I.

The terms "lower-alkyl" and "lower-alkoxy," as used herein, e.g., as meanings for Q in Formula I or for $R_1$, $R_2$ or $R_3$ (when lower-alkyl), mean alkyl and alkoxy radicals having from one to six carbon atoms, illustrated by methyl, ethyl, n-propyl, isopropyl, n-butyl, 2-butyl, isobutyl, n-amyl, n-hexyl, and the like, for lower-alkyl, and by methoxy, ethoxy, n-propoxy, isopropoxy, n-butoxy, 2-butoxy, n-hexoxy, and the like, for lower-alkoxy.

The term "halo," as used herein, e.g., as one of the meanings for Q in Formula I, means chloro, bromo, iodo or fluoro, with chloro being preferred because of the ready availability and cost advantages of chloro intermediates.

The term "lower-2-hydroxyalkyl," as used herein, e.g., as meanings for $R_1$ and $R_2$ in Formula I, are hydroxyalkyl radicals having from two to six carbon atoms and having the hydroxy group attached to the carbon atom that is one carbon atom removed from the side chain nitrogen atom, illustrated by 2-hydroxyethyl, 2-hydroxypropyl, 2-hydroxy-2-methylpropyl, 2-hydroxybutyl, 2-hydroxy-2, 2-dimethylpropyl, 2-hydroxy-2-ethylpropyl, 2-hydroxyhexyl, and the like.

The term "lower-alkylene," as used herein, e.g., as represented by Y in Formula I, are alkylene radicals having from two to four carbon atoms and having its connecting linkages on different carbon atoms, illustrated by

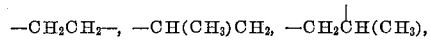

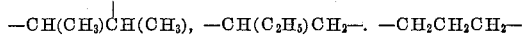

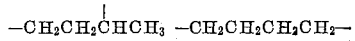

and the like.

When $NR_1R_2$ of Formula I comprehends (lower-alkylated)-N-heteromonocyclic radicals, lower-alkyl radicals can be attached to any available ring-atom and can vary preferably from one to three in number, e.g., 2-methylpiperidino, 3-ethylpiperidino, 4-methylpiperidino, 2,6-dimethylpiperidino, 2,4-dimethylpiperidino, 2,4,6-trimethylpiperidino, 3 - n - propylpiperidino, 2,2 - dimethylpiperidino, 2 - methylpyrrolidino, 2,5 - dimethylpyrrolidino, 2,3-dimethylmorpholino, 2-ethylmorpholino, 2-methylhexamethyleneimino, 2,7-dimethylhexamethyleneimino, 4-methylpiperazino, 3-ethylpiperazino, 2,4,6-trimethylpiperazino, and the like.

Our invention sought to be patented in its process aspect comprises subjecting a compound of Formula I where Q, X, Z, Y, $R_3$ and $NR_1R_2$ have the meanings given for Formula I but where R is methyl, to the fermentative enzymatic action of a microorganism capable of effecting oxidation of the 4-methyl group to 4-hydroxymethyl and/ or 4-formyl, said microorganism being of an order selected from the group consisting of Moniliales, Mucorales and Sphaeriales. Not all species and genera of organisms within these orders are effective in the process, but whether a given specific organism is effective can readily be determined by following the general screening procedure described in the following paragraph. A particularly preferred microorganism is *Aspergillus sclerotiorum*.

The above-described process aspect of the invention is disclosed and claimed in our copending divisional application Serial No. 558,196, filed March 7, 1966.

GENERAL SCREENING PROCEDURE

An illustrative general screening procedure used to evaluate the ability of microorganisms to transform 1-($R_1R_2N$ - Y-$NR_3$)-4-methylthioxanthenes, -4-methylxanthenes and the above-noted derivatives is described as follows: Microorganisms to be screened are inoculated onto Sabouraud's agar slants or other agar base media suitable for growth. The inoculated slants are then placed in a 25° C. incubator and allowed to grow for one week. After one week's growth, the slant is removed and 15 ml. of sterile distilled water is added to it, and the spores and vegetative growth are loosened from the agar with a sterile needle. This suspension is then transferred to a flask containing 100 ml. of soy-dextrose medium of the composition:

| | |
|---|---|
| Soybean meal _____ g__ | 5 |
| Dextrose _____ g__ | 20 |
| NaCl _____ g__ | 5 |
| $K_2HPO_4$ _____ g__ | 5 |
| Yeast _____ g__ | 5 |
| Tap water _____ l__ | 1 |
| pH to 6.4 | |

Autoclave at 15 lbs. per sq. in. for 15 min.

and the flask is placed on a rotary shaker located in a 25° C. incubator and agitated at about 260 r.p.m. for twenty-four hours. After this initial time period (first stage seed), 5 ml. of the submerged growth is added to duplicate flasks (250 ml.) containing the above-noted soy-dextrose medium. These flasks are placed in the shaker and allowed to grow from forty-eight to seventy-two hours at 25° C. after which 5 mg. of substrate (a 4-methylthioxanthene or 4-methylxanthene) dissolved in minimum amount of water, water-ethanol, dimethylformamide, acetone or $CH_3OH$ is added to one of the pair of flasks. The other flask receives only the solvent and serves as the control. These flasks are then agitated under the same conditions for an additional twenty-four hours before they are removed from the shaker. Growth characteristics and pH are noted, and to the whole beer of each flask is added two volumes of methylene dichloride. The flasks are then agitated at 200 r.p.m. for two one-minute intervals. The heavier methylene dichloride extract is then siphoned off and the solvent removed by warming in a water bath at about 60° C. Then each residue is dissolved in 1 ml. of methylene dichloride for application to thin-layer plate for chromatographic analysis (described below).

The nature of the material produced can be detected by thin-layer chromatography, and the 4-formyl- or 4-hydroxymethylthioxanthene or -xanthene and the corresponding intermediate 4-methylthioxanthene or -xanthene (if not completely converted) isolated by column chromatography on conventional adsorbents such as silica gel or alumina.

The screening samples were all chromatographed on silica gel thin-layer plates (T.L.C.) using a suitable system, a preferred one consisting of nine volumes of ethyl acetate and one volume of triethylamine. The 4-hydroxymethyl compound appears as a less mobile (more polar) spot than the intermediate 4-methyl compound in said preferred chromatographic system. The 4-formyl compound appears as a spot between the 4-methyl and 4-hydroxymethyl compounds. The silica gel containing the more polar spots is removed and each spot is eluted with absolute methanol and the eluates subjected to ultra-violet (UV) spectral analysis.

Large batch fermentations and procedures for isolating sufficient quantities of crystalline 4-hydroxymethyl and 4-formyl compounds for elementary analyses and schistosomicidal studies in specific examples hereinbelow will further illustrate aspects of our invention without, however, limiting it thereto.

The above-described general screening procedure and the batch fermentations given below in the specific examples are illustrative and can be varied in different ways: by using other microorganisms whose fermentative enzymatic action is capable of effecting the oxidation of said 4-methylthioxanthenes or 4-methylxanthenes to the corresponding 4-hydroxymethyl and/or 4-formyl compounds; by using other nitrogen sources in place of soybean meal, e.g., corn meal, oat meal, milk protein hydrolysates, other protein hydrolysates, corn steep liquor, meat extract, etc.; by using other carbon sources in place of dextrose, e.g., sucrose, glucose, maltose, starch, molasses, etc.; by varying the time of addition of the substrate after addition of the medium from 0 to 72 hours; by varying the initial pH from about 5.0 to about 7.5, preferably between 5.5 and 6.5; by varying the quantity of substrate; by varying the rate of stirring; and, by utilizing other modifications known in the fermentative art.

Our compounds of Formula I are useful in the free base form or in the form of their acid-addition salts, and both forms are within the purview of the invention, and, in fact, are considered to be one and the same invention. The acid-addition salts are simply a more convenient form for use; and, in practice, use of the salt for inherently amounts to use of the base form. The acids which can be used to prepare the acid-addition salts are preferably those which produce, when combined with the free base, chemotherapeutically acceptable salts, that is, salts whose anions are relatively innocuous to the animal organism in chemotherapeutic doses of the salts, so that the beneficial properties inherent in the free base are not vitiated by side effects ascribable to the anions; in other words, the latter do not substantially affect the chemotherapeutic properies inherent in the cations. In practicing our invention, we found it convenient to employ the hydrochloride salt. However, other appropriate chemotherapeutically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, 3-hydroxy-2-naphthoic acid, pamoic acid (2,2' - dihydroxy - 1,1'-dinaphthylmethane-3,3'-dicarboxylic acid), naponic acid (1,5-naphthalenedisulfonic acid), and the like, giving the hydrobromide, hydriodide, nitrate, phosphate, sulfamate, sulfate, acetate, citrate, tartrate, lactate, methanesulfonate, ethanesulfonate, quinate, 3-hydroxy-2-naphthoate, pamoate and naponate, respectively.

The acid-addition salts are prepared preferably by reacting the free base and acid in an organic solvent, e.g., ethanol, in which case the salt separates directly or can be obtained by concentration of the solution.

Although chemotherapeutically acceptable salts are preferred, all acid-addition salts are within the scope of our invention. All acid-addition salts are useful as sources of the free base form even if the particular salt per se is not desired as the final product, as for example when the salt is formed for purposes of purification or identification, or when it is used as an intermediate in preparing a chemotherapeutically acceptable salt by ion exchange procedures.

Also encompassed by our invention are simple esters of our 4-hydroxymethyl compounds, for example, loweralkanoates (e.g., acetate, propionate, butyrate, etc.), benzoates (e.g., benzoate, 3,5-dinitrobenzoate, etc.), carbanilate, etc., as well as conventional aldehyde characterizing derivatives of our 4-formyl compounds, for example, semicarbazone, thiosemicarbazone, etc., said esters and aldehyde derivatives being useful to further characterize and identify our 4-hydroxymethyl and 4-formyl compounds.

The molecular structures of the compounds of our invention are established by their nuclear magnetic resonance, infrared and ultraviolet spectra, and corroborated by the correspondence of calculated and found values for the elementary analyses.

The following examples will further illustrate the invention without, however, limiting it thereto.

*Example 1*

Conversion of 1-(2-diethylaminoethylamino)-4-methylthioxanthen-9-one into the corresponding 4-hydroxymethyl and 4-formyl compounds was carried out as follows: 1 - (2 - diethylaminoethylamino) - 4 - methylthioxanthen - 9 - one as its hydrochloride was first subjected to the fermentative action of *Aspergillus sclerotiorum* (SWRI A$_{24}$, available at Sterling-Winthrop Research Institute, Rensselaer, New York) using the above-described general screening procedure. There were thus produced two more polar products with concomitant loss of starting material as evidenced by thin layer chromatography. After preliminary studies in flasks which indicated that fermentations at substrate levels of 0.2 to 0.4 g./l were feasible, 10 liter fermentations were carried out in 14 liter stirred fermentation vessels containing 10 liters of sterile soy-dextrose medium composed of the following ingredients (weight per volume):

| | Percent |
|---|---|
| Soybean meal | 2.0 |
| Dextrose | 2.0 |
| Brewers yeast | 0.5 |
| NaCl | 0.5 |
| K$_2$HPO$_4$ | 0.5 |

Tap water (pH adjusted to 6.4 with 10N HCl prior to autoclaving).

Four fermentors were inoculated with a 10%, seventy-two hour old culture of *Aspergillus sclerotiorum* (SWRI A$_{24}$) incubated at 26° C. in 100 ml. of said sterile soy-dextrose medium contained in 500 ml. flasks. These flasks were aerated on a shaker rotating at 260 r.p.m. The inoculated fermentors were agitated at 450 r.p.m. and aerated at a level of 4 liters of air per minute and at a temperature of 31° C. for forty-eight hours. At the end of this time, 3 g. of 1-(2-diethylaminoethylamino)-4-methylthioxanthen-9-one hydrochloride dissolved in 200 ml. of warm sterile water was added to each fermentor. An anti-foam agent, e.g., UCON–LB 625 (Union Carbide Chemicals), was added automatically as required. Aliquots from the tanks were taken and assayed periodically by transferring a portion of the dried extract to a thin layer silica gel plate using ethyl acetate with 1% ammonium hydroxide as developing solvent; 10% triethylamine was used in place of the ammonium hydroxide in other runs. When chromatography revealed that all or most of the starting material had disappeared, the fermentations were terminated. The total fermentation beer was acidified with hydrochloric acid and extracted twice with 20 liter portions of dichloromethane. Concentration of the extracts under reduced pressure and subsequent chromatography on a silica gel column (4 x 28 cm.) using increasing amounts of ethyl acetate in n-hexane followed by increasing amounts of methanol in ethyl acetate afforded, as orange-yellow microcrystals, 0.8 g. of 1-(2-diethylaminoethylamino) - 4 - hydroxymethylthioxanthen - 9 - one hydrochloride, M.P. 173.0–176.0° C. (corr.) with decomposition.

*Analysis.*—Calcd. for C$_{20}$H$_{24}$N$_2$O$_2$S.HCl: C, 61.13; H, 6.41; N, 7.13. Found: C, 60.97; H, 6.43; N, 7.16.

The nuclear magnetic resonance (NMR) spectrum of the above 4-hydroxymethyl product (in free base form) showed it to be lacking the methyl signal—

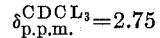

with external reference of tetramethylsilane as

present in the 4-methyl precursor (in free base form) while a new signal

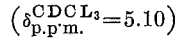

signified the presence of the two methylene protons of the 4-hydroxymethyl group. Its infrared (IR) spectrum (KBr) when compared with that of the 4-methyl intermediate showed an enhancement of intensity of the band in the OH/NH region near 3$\mu$, confirming the introduction of an OH group. Its ultraviolet (UV) spectrum (in 95% ethanol) showed absorption bands like those of the corresponding 4-methyl compound, showing the presence of the same aromatic nucleus in the two compounds.

In another run following the above procedure both the 4-formyl and 4-hydroxymethyl compounds were isolated. As above, four 10 liter tanks were used. Five grams of 1-(2-diethylaminoethylamino)-4-methylthioxanthen-9-one hydrochloride was added to each tank and twenty-four hours later, the fermentation liquors of the tanks were combined and extracted with two 80 liter portions of methylene dichloride, but omitting the acidification of the total fermentation beer. The combined extracts were concentrated under reduced pressure; 500 ml. of methanol was added and the mixture filtered; and the filtrate was concentrated under reduced pressure to remove the solvent. The concentrate was mixed with 125 g. of silica gel and air-dried. About 300 ml. of n-hexane was thoroughly mixed with this material, the n-hexane removed by decantation and the material air-dried. The material was placed on an 1100 g. silica gel column (7 x 38 cm.) and developed with an eluant consisting of 40% ethyl acetate, 57.5% n-hexane and 2.5% triethylamine; 500 ml. fractions were collected. Fractions 11–23 contained some starting 4-methyl compound and the 4-formyl compound (indicated by T.L.C.), and were combined for purification on another column of 300 g. of silica gel (3.5 x 44 cm.). This column was developed with an eluant of 60% ethyl acetate, 37.5% n-hexane and 2.5% triethylamine, 500 ml. fractions being collected. Fractions 3–7, which contained the 4-formyl compound, were combined and taken to dryness, and the remaining solid was recrystallized from n-hexane-ethyl acetate to yield 1.18 g. of 1-(2-diethylaminoethylamino)thioxanthen - 9 - one - 4 - carboxaldehyde, M.P. 119.4–120.6° C. (corr.).

*Analysis.*—Calcd. for C$_{20}$H$_{22}$N$_2$O$_2$S: C, 67.77; H, 6.26; N, 7.90; S, 9.05. Found: C, 67.46; H, 6.40; N, 7.74; S, 8.62.

The nuclear magnetic resonance (NMR) spectrum of the above 4-formyl product showed it to be lacking the methyl signal—

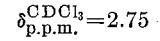

with external reference of tetramethylsilane as

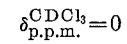

present in the 4-methyl precursor while a new signal

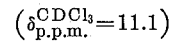

signified the presence of the proton attached to the 4-carbonyl group. Its infrared (IR) spectrum (KBr) when compared with that of the 4-methyl intermediate showed a new band near 6μ which is characteristic of the C=O frequency.

Fractions 36–79 of the original column were combined and placed on a 1000 g. silica gel column (7 x 36 cm.) for chromatographic purification. The eluant used consisted of 40% ethyl acetate, 57.5% n-hexane and 2.5% triethylamine; one liter fractions were collected. After a T.L.C. on each fraction had been obtained, fractions 5–21 were combined and evaporated to near dryness. n-Hexane was added and the solid was collected to yield 6.97 g. of 1-(2-diethylaminoethylamino)-4-hydroxymethylthioxanthen-9-one, M.P. 92.2–95.4° C. (corr.).

Analysis.—Calcd. for $C_{20}H_{24}N_2O_2S$: C, 67.38; H, 6.79; N, 7.86; S, 8.99. Found: C, 67.20; H, 6.49; N, 7.98; S, 8.49.

In the following Table A are listed other organisms which, when screened by the above-described fermentative screening procedure, have been found to effect the oxidation of 1-(2-diethylaminoethylamino)-4-methylthioxanthen-9-one to produce the corresponding 4-hydroxymethyl and 4-formyl compounds.

TABLE A

Order: Moniliales—
  Aspergillus flavipes, ATCC 11013
  Aspergillus niger, ATCC 11394
  Aspergillus sclerotiorum, CMI 56673
Order: Mucorales—
  Mucor griseo-cyanus, ATCC 1207A
  Mucor parasiticus, ATCC 6476
  Syncephalis nodosa, ATCC 7943
  Thamnidium elegans, ATCC 8997
Order: Sphaeriales—
  Chaetomium globosum, SWRI Ch₄
  Chaetomium nigricolor, ATCC 11211
  Didymella lycopersici, ATCC 11847

ATCC=American Type Culture Collection number.
CMI=Commonwealth Mycological Institute number.
SWRI=Sterling-Winthrop Research Institute number.

*Example 2*

Following the procedure described in Example 1 with the modifications noted below, 4-methyl-1-[2-(2-methylpiperidino)ethylamino]thioxanthen - 9 - one (18 g. as its hydrochloride) was converted into its corresponding 4-hydroxymethyl and 4-formyl compounds. In order to obtain a sufficient amount of the 4-hydroxymethyl compound for biological evaluation, three 10 liter fermentations were carried out at substrate levels of 0.6 g./liter. A total of 3 g. of the 4-hydroxymethyl compound obtained from the concentrated extracts was chromatogrammed on a silica gel column (4.5 x 48 cm.) using 70% ethyl acetate, 29.5% hexane and 0.5% ammonium hydroxide as eluant, 400 ml. fractions being collected. Fractions 36–50 were combined and taken to dryness. The resulting solid was washed in distilled water and extracted with methylene dichloride; and the extract was filtered and evaporated to dryness, yielding 0.63 g. of 4 - hydroxymethyl - 1 - [2 - (2 - methylpiperidino)ethylamino]thioxanthen-9-one, M.P. 121.8–125.0° C. (corr.).

Analysis.—Calcd. for $C_{22}H_{26}N_2O_2S$: C, 69.08; H, 6.85; N, 7.33. Found: C, 69.25; H, 6.92; N, 7.21.

As in Example 1, the structure of this compound was confirmed by its NMR, IR and UV spectral analyses, its NMR signal of $$\delta^{CDCl_3}_{p.p.m.} = 5.18$$

signifying the presence of the two methylene protons of the 4-hydroxymethyl group. It also lacked the methyl signal $$\left(\delta^{CDCl_3}_{p.p.m.} = 2.67\right)$$

of the 4-methyl intermediate.

Fractions 10–28 of the above fermentative oxidation were combined and taken to dryness; the solid was washed with distilled water and extracted with methylene dichloride; and the extract was filtered and evaporated to dryness, yielding about 0.16 g. 1-[2-(2-methylpiperidino)ethylamino]thioxanthen - 9 - one - 4 - carboxaldehyde, M.P. 131–134° C. As in Example 1, its NMR and IR spectra confirmed the assigned structure, its NMR signal of $$\delta^{CDCl_3}_{p.p.m.} = 10.25$$

signifying the presence of the single proton of the 4–CHO substituent.

*Example 3*

Following the procedure described in Example 2, 4-methyl - 1 - (2 - piperidinoethylamino)thioxanthen-9-one (as its hydrochloride, 6.0 g.) was converted into 4-hydroxymethyl - 1 - (2 - piperidinoethylamino)thioxanthen-9-one (1.16 g.), M.P. 143.5–146.0° C. (corr.) and 1-(2-piperidinoethylamino)thioxanthen - 9 - one - 4 - carboxaldehyde (98 mg.), M.P. 140° C. (recrystallized from ethyl acetate). The IR and NMR spectra of these compounds confirmed their structures, both NMR spectra lacking the 4-methyl signal $$\left(\delta^{CDCl_3}_{p.p.m.} = 2.72\right)$$

of the 4-methyl precursor and containing, respectively, new signals of $$\delta^{CDCl_3}_{p.p.m.} = 5.18$$

(for two methylene protons of $CH_2OH$ group) and $$\delta^{CDCl_3}_{p.p.m.} = 1.028$$

(for the formyl proton). The 4-hydroxymethyl compound was submitted for analysis.

Analysis.—Calcd. for $C_{21}H_{24}N_2O_2S$: C, 68.45; H, 6.57; N, 7.60. Found: C, 68.66; H, 6.68; N, 7.20.

*Example 4*

Following the procedure described in Example 1, 6-chloro - 1 - (2 - diethylaminoethylamino - 4 - methylthioxanthen-9-one (4.0 g. as its hydrochloride) was converted into 6 - chloro - 1 - (2-diethylaminoethylamino)-4-hydroxymethylthioxanthen-9-one and 6 - chloro - 1 - (2-diethylaminoethylamino)thioxanthen - 9 - one - 4 - carboxaldehyde. There was isolated 0.40 g. of the 4-hydroxymethyl compound, M.P. 114.8–116.8° C. (corr.).

Analysis.—Calcd. for $C_{20}H_{23}ClN_2O_2S$: C, 61.45; H, 5.93; N, 7.17. Found: C, 61.29; H, 5.90; N, 6.79.

Its NMR, IR and UV spectral analyses confirmed its structure, its NMR spectrum having a signal of $$\delta^{CDCl_3}_{p.p.m.} = 5.10$$

(for the two methylene protons of the $CH_2OH$ group).

*Example 5*

Following the procedure described in Example 1, 1-(2 - diethylaminoethylamino) - 4 - methylxanthen-9-one was converted into its corresponding 4-hydroxymethyl and 4-formyl compounds. One 10 liter fermentator was used. Four grams of the 4-methyl compound as its hydrochloride was added to the fermentator and twenty-four hours later the fermentation was terminated. The beer was extracted with methylene dichloride, the extract concentrated to remove the solvent, the concentrate (about 200 ml.) added to 50 g. of silica gel and the mixture placed on a 300 g. silica gel column (3.5 x 44 cm.). The column was developed with ethyl ether containing 2% triethylamine and 1% methanol, 200 ml. fractions being collected. On examination by T.L.C., fractions 4–7 were found to contain the 4-formyl compound and fractions 8–20 were found to contain the 4-hydroxymethyl derivative. Fractions 8–20 were combined, concentrated in vacuo and the remaining solid recrystallized from ethyl acetates to yield 1.41 g. of 1-(2-diethylaminoethylamino) - 4 - hydroxymethylxanthen-9-one, M.P. 131.0–132.8° C. (corr.).

*Analysis.*—Calcd. for $C_{20}H_{24}N_2O_3$: C, 70.56; H, 7.10; N, 8.23. Found: C, 70.72; H, 7.21; N, 8.22.

Its structure was confirmed by its NMR, IR and UV spectral analyses, with it having an NMR signal of $$\delta^{CDCl_3}_{p.p.m.} = 5.2$$

(for the two methylene protons of the CH₂OH group).

Example 6

Following the procedure described in Example 1, 6-chloro - 4 - methyl - 1 - [2-(2-methylpiperidino)-ethylamino]thioxanthen-9-one (2.2 g. as its hydrochloride) was converted into the corresponding 4-hydroxymethyl and 4-formyl compounds. There was isolated 0.26 g. of 6 - chloro - 4 - hydroxymethyl - 1 - [2-(2-methylpiperidino)ethylamino]thioxanthen-9-one, M.P. 141–145° C. Its NMR, IR and UV spectral data confirmed its structure, with it having an NMR signal of $$\delta^{CDCl_3}_{p.p.m.} = 5.11$$

(for the two methylene protons of the CH₂OH group).

Example 7

Following the procedure described in Example 1, 1-(2-diethylaminoethylamino) - 4 - methylthioxanthen-9-one-10,10-dioxide (1.5 g. as its hydrochloride) was converted into the corresponding 4-hydroxymethyl and 4-formyl compounds. There was isolated 0.37 g. of 1-2-diethylaminoethylamino) - 4 - hydroxymethylthioxanthen - 9-one-10,10-dioxide, M.P. 124–125.5° C. Its NMR, IR and UV spectral data confirmed its structure, with it having an NMR signal of $$\delta^{CDCl_3}_{p.p.m.} = 5.5$$

(for the two methylene protons of the CH₂OH group).

Following the above-described screening procedure using *Aspergillus sclerotiorum* (SWRI $A_{24}$), the 4-hydroxymethylthioxanthen - 9 - ones and 4-hydroxymethylxanthen-9-ones of Table B, as well as the corresponding 4-formyl compounds, were prepared from the corresponding 4 - methylthioxanthen - 9 - ones and 4-methylxanthen-9-ones, used as their hydrochlorides.

TABLE B

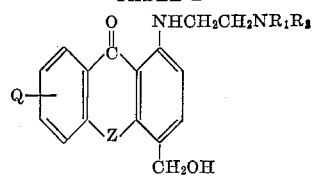

| Example | Q | Z | NR₁R₂ |
|---|---|---|---|
| 8 | 6-Cl | S | N(C₂H₅)(CH₂CH₂OH) |
| 9 | H | SO | N(C₂H₅)₂ |
| 10 | 7-Br | O | N(C₂H₅)₂ |
| 11 | H | O | NC₅H₁₀ [1] |
| 12 | H | S | NH(CH₂C(CH₃)₂OH) |
| 13 | H | O | NC₆H₁₂ [2] |
| 14 | 6-Cl | S | N(C₂H₅)(CH₂C(CH₃)₂OH) |

[1] $NC_5H_{10}$ = Piperidino.
[2] $NC_6H_{12}$ = 2-methylpiperidino.

Following the procedure described in Examples 1, 2 and 5 using the appropriate 1-($R_1R_2N$-Y-$NR_3$)-4-methylthioxanthene or -4-methylxanthene, the corresponding 4-hydroxymethyl compounds of Table C, as well as the corresponding 4-carboxaldehyde derivations can be prepared.

TABLE C

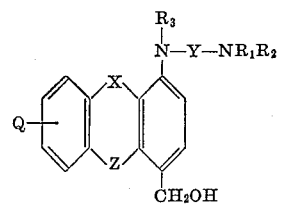

| Example | X | Z | R₃ | Y | NR₁R₂ | Q |
|---|---|---|---|---|---|---|
| 15 | CHOH | S | H | CH₂CH₂ | N(C₂H₅)₂ | H |
| 16 | CH₂ | S | H | CH₂CH₂ | N(C₂H₅)₂ | H |
| 17 | C=O | SO | H | CH₂CH₂ | N(C₂H₅)₂ | H |
| 18 | CH₂ | SO₂ | H | CH₂CH₂ | N(C₂H₅)₂ | H |
| 19 | C=O | O | H | CH₂CH₂ | N(C₂H₅)(CH₂CH₂OH) | |
| 20 | CHOH | O | H | CH₂CH₂ | N(C₂H₅)₂ | H |
| 21 | CH₂ | O | H | CH₂CH₂ | N(C₂H₅)₂ | H |
| 22 | C=O | O | H | (CH₂)₃ | NC₅H₁₀ [1] | 6-Cl |
| 23 | C=O | O | H | (CH₂)₄ | NC₄H₈ [2] | 7-CH₃ |
| 24 | C=O | O | H | CH₂CH₂ | N(C₄H₉-n)₂ | 8-OCH₃ |
| 25 | C=O | O | H | CH(CH₃)CH₂ | N(CH₃)₂ | 5-Cl |
| 26 | C=O | S | CH₃ | CH₂CH₂ | N(C₂H₅)₂ | H |
| 27 | C=O | S | H | CH₂CH(CH₃) | N(CH₃)₂ | H |
| 28 | C=O | S | H | CH₂CH₂ | NC₄H₈ [2] | H |
| 29 | C=O | S | C₂H₅ | (CH₂)₄ | N(C₂H₅)₂ | 5-CH₃ |
| 30 | C=O | S | H | CH₂CH₂ | N(C₆H₁₃-n)₂ | 7-Cl |
| 31 | C=O | S | H | CH₂CH₂ | NC₄H₈O [3] | 7-Br |
| 32 | C=O | S | H | CH₂CH₂ | NC₆H₁₂ [4] | 7-OC₂H₅ |
| 33 | C=O | S | H | CH₂CH₂ | NC₆H₁₂ [5] | 8-CH₃ |
| 34 | C=O | S | H | CH₂CH₂ | NC₇H₁₄ [6] | 6,7-(OCH₃)₂ |
| 35 | C=O | S | H | CH₂CH₂ | N(C₂H₅)₂ | 5,6,7-(CH₃)₃ |
| 36 | C=O | S | H | CH₂CH₂ | NHC₂H₅ | H |
| 37 | C=O | S | H | CH₂CH₂ | NHCH₂CH₂OH | H |

See footnotes at end of table.

TABLE C—Continued

| Example | X | Z | $R_3$ | Y | $NR_1R_2$ | Q |
|---|---|---|---|---|---|---|
| 38 | C=O | S | H | $CH_2CH_2$ | $N\begin{smallmatrix}C_2H_5\\CH_2CH_2OH\end{smallmatrix}$ | |
| 39 | C=O | S | H | $CH_2CH_2$ | $N\begin{smallmatrix}C_2H_5\\CH_2C(CH_3)_2OH\end{smallmatrix}$ | |
| 40 | C=O | S | H | $CH_2CH_2$ | $N(CH_3)_2$ | H |
| 41 | C=O | S | H | $CH_2CH_2$ | $N(C_4H_9\text{-}n)_2$ | H |
| 42 | C=O | O | H | $CH_2CH_2$ | $N(CH_3)_2$ | H |
| 43 | C=O | O | H | $CH_2CH_2$ | $N(C_4H_9\text{-}n)_2$ | H |
| 44 | C=O | O | $CH_3$ | $CH_2CH_2$ | $N(C_2H_5)_2$ | H |
| 45 | C=O | S | H | $CH_2CH_2$ | $N(CH_2CH_2OG)_2$ | H |
| 46 | C=O | S | H | $(CH_2)_3$ | $N(C_2H_5)_2$ | H |

1 $NC_5H_{10}$=Piperidino.
2 $NC_4H_8$=Pyrrolidino.
3 $NC_4H_8O$=Morpholino.
4 $NC_6H_{12}$=Hexamethyleneimino.
5 $NC_6H_{12}$=2,5-dimethylpyrrolidino.
6 $NC_7H_{14}$=2,6-dimethylpiperidino.

Example 47

Following the procedure described in Example 1, 4-methyl-1-[2-(2-methylpiperidino)ethylamino]xanthen-9-one (5 g. as its hydrochloride) was converted into 4-hydroxymethyl - 1 - [2 - (2 - methylpiperidino)ethylamino]xanthen-9-one and 1-[2-(2-methylpiperidino)ethylamino]xanthen-9-one - 4 - carboxaldehyde. There was isolated 2.18 g. of the 4-hydroxymethyl compound, M.P. 134.0–136.2° C. (corr.).

*Analysis.*—Calcd. for $C_{22}H_{26}N_2O_3$: C, 72.11; H, 7.15; N, 7.65. Found: C, 72.02; H, 7.32; N, 7.61.

NMR, IR and UV spectral analyses confirmed its structure.

The intermediate 4 - methyl-1-[2-(2-methylpiperdino)ethylamino]xanthen-9-one was prepared as follows: A mixture containing 6.2 g. of 1-chloro-4-methylxanthen-9-one, 12 g. of 2-(2-methylpiperdino)ethylamine and 12 ml. of pyridine was refluxed for eighteen hours and the solvent distilled off under reduced pressure. The residue was treated with dilute acetic acid and the mixture filtered. The filtrate was made alkaline with 35% aqueous sodium hydroxide solution and the oil that separated crystallized slowly. The mixture was extracted with chloroform and the extract dried over anhydrous magnesium sulfate. The chloroform was distilled off, the remaining oil dissolved in 50 ml. of absolute ethanol, the resulting solution treated with 3.7 ml. of 7.1 N ethanolic hydrogen chloride and placed in a refrigerator. The resulting precipitate was collected, washed with absolute ethanol and dried for four hours at 80° C. in vacuo (20 mm.) to yield 6.2 g. of 4-methyl-1-[2-(2-methylpiperdino)ethylamino]xanthen-9-one hydrochloride, M.P. 229.0–232.0° C. (corr.).

*Analysis.*—Calcd. for $C_{22}H_{26}N_2O_2 \cdot HCl$: Cl, 9.16; N, 7.24. Found: Cl, 8.98; N, 7.40.

Example 48

Following the procedure described in Example 1, 6-chloro - 1 - (2 - diethylaminoethylamino) - 4 - methylxanthen-9-one (3 g. as its hydrochloride) was converted into the corresponding 4-hydroxymethyl and 4-formyl compounds. After three recrystallizations from ethyl acetate-n-hexane, there was obtained 0.350 g. of 6-chloro-1-(2-diethylaminoethylamino)-4-hydroxymethylxanthen-9-one, M.P. 130.0–132.8° C. (corr.).

*Analysis.*—Calcd. for $C_{20}H_{23}ClN_2O_3$: C, 64.08; H, 6.18; Cl, 9.46. Found: C, 64.01; H. 6.40; Cl. 9.49.

Example 49

Following the procedure described in Example 1, 1-(2-ethylaminoethylamino)-4-methylthioxanthen-9-one (10 g. as its hydrochloride) was converted into the corresponding 4-hydroxymethyl and 4-formyl compounds. After one recrystallization from ethyl acetate, there was obtained 0.91 g. of 1-(2-ethylaminoethylamino)-4-hydroxymethylthioxanthen-9-one, M.P. 150.0–151.6° C. (corr.) with decomposition.

*Analysis.*—Calcd. for $C_{18}H_{20}N_2O_2S$: C, 65.83; H, 6.14; S. 9.72. Found: C, 65.89; H, 6.05; S, 9.62.

Example 50

1-(2-diethylaminoethylamino) - 4 - hydroxymethylthioxanthen-9-ol was prepared in two steps from 1-(2-diethylaminoethylamino)thioxanthen-9-one-4 - carboxaldehyde as follows: 1 g. of 1-(2-diethylaminoethylamino)thioxanthen-9-one-4-carboxaldehyde was dissolved in 175 ml. of anhydrous warm methanol under an atmosphere of nitrogen. To the solution was added 0.2 g. of sodium borohydride whereupon evolution of hydrogen gas commenced immediately and the color of the solution turned from yellow to orange. After five minutes a sample was taken and on examination by T.L.C., it was determined that reduction had taken place to yield 1-(2-diethylaminoethylamino)-4-hydroxymethylthioxanthen-9-one. After an additional hour, no further reaction took place. To the reaction mixture was then added 0.4 g. of sodium borohydride; however, no further change occurred as determined by T.L.C. examination. The same was true after an additional 0.4 g. of sodium borohydride was added and the reaction mixture heated on a steam bath for five minutes. To the reaction mixture was then added about 2 g. of sodium amalgam and the mixture stirred for five hours. To the reaction mixture was added 200 ml. of ice water and the gummy precipitate that separated was collected and dissolved in methylene dichloride. The solution was washed with water, the methylene dichloride evaporated off, and the residue taken up in ethyl acetate. When no product was obtained from the ethyl acetate solution, the above aqueous mother liquor was placed in a refrigerator over-night whereupon a white solid separated. The solid was collected, washed with water and recrystallized from ethyl acetate to yield 0.289 g. of the product, 1-(2-diethylaminoethylamino)-4-hydroxymethylthioxanthen-9-ol, M.P. 132.0–133.0° C. (corr.) with decomposition.

*Analysis.*—Calcd. for $C_{20}H_{26}N_2O_2S$: N, 7.81; S, 8.94. Found: N, 7.89; S, 9.03.

Example 51

Oxidation of 1-(2-diethylaminoethylamino)-4-hydroxymethylthioxanthen-9-one to yield its corresponding 10-oxide was carried out as follows: To a solution containing 6 g. of 1-(2-diethylaminoethylamino)-4-hydroxymethylthioxanthen-9-one in a minimum quantity of 5% aqueous acetic acid was added 30 ml. of 30% hydrogen peroxide.

The reaction mixture was allowed to stand in a cold room over the weekend and then at room temperature for twelve hours; it was made basic with ammonium hydroxide and extracted three times with 200 ml. portions of methylene dichloride. The extracts were combined and taken to dryness. The residue was mixed with 25 g. of silica gel and placed on a 250 g. silica gel column. The column was developed with ether plus 1% triethylamine and increasing amounts of methanol from 0.5% to 5%. The latter fractions (19–24) eluted with 5% methanol, 1% triethylamine and 94% ether were combined and the solvent removed to yeld 0.56 g. of the product, 1-(2-diethylaminoethylamino) - 4 - hydroxymethylthioxanthen - 9-one-10-oxide, M.P. 119.0–121.0° C. (corr.) with decomposition.

Analysis.—Calcd. for $C_{20}H_{24}N_2O_3S$: C, 64.49; H, 6.49; N, 7.52. Found: C, 64.54; H, 6.19; N, 7.77.

Its structure was confirmed by NMR, IR and UV spectral analyses.

Example 52

To a solution of 10 g. of 1-(2-diethylaminoethylamino)-4-hydroxymethylthioxanthen-9-one in 25 ml. of dimethylformamide was added 5.5 g. of pamoic acid in 25 ml. of dimethylformamide. The solution was filtered and the filtrate placed in an ice bath for about two hours. The crystalline precipitate was collected and recrystallized from dimethylformamide to yield 3.0 g. of 1-(2-diethylaminoethylamino) - 4 - hydroxymethylthioxanthen - 9-one pamoate, M.P. 212.5–214.0° C. (corr.) with decomposition.

Analysis.—Calcd. for $(C_{20}H_{24}N_2O_2S)_2 \cdot C_{23}H_{16}O_6$: S, 5.82; Base, 64.6. Found: S, 5.79; Base, 64.7.

Example 53

To a solution of 5 g. of 1-(2-diethylaminoethylamino)-4-hydroxymethylthioxanthen-9-one in 15 ml. of dimethylformamide was added a solution containing 2.65 g. of 3-hydroxy-2-naphthoic acid in 15 ml. of dimethylformamide. The hot solution was filtered and the filtrate placed in a freezer for two hours. The yellow crystalline precipitate was collected and recrystallized from dimethylformamide to yield 5.2 g. of 1-(2-diethylaminoethylamino)-4-hydroxymethylthioxanthen-9-one 3-hydroxy-2-naphthoate, M.P. 220.5–222.0° C. (corr.) with decomposition.

Analysis.—Calcd. for $C_{20}H_{24}N_2O_2S \cdot C_{11}H_8O_3$: S, 5.89; Base, 65.5. Found: S, 6.06; Base, 66.2.

Example 54

To a solution containing 1 g. of 1-(2-diethylaminoethylamino)-4-hydroxymethylthioxanthen-9-one in 0.9 ml. of pyridine was added 0.8 ml. of acetic anhydride and the mixture heated gently in a bath of warm water. In about five minutes light yellow crystals separated, filling the reaction mixture. Ether was added, and the crystalline product was collected and recrystallized from ether to yield 0.86 g. of 4-acetoxymethyl-1-(2-diethylaminoethylamino)thioxanthen-9-one, M.P. 120.6–122.0° C. (corr.).

Analysis.—Calcd. for $C_{22}H_{26}N_2O_3S$: C, 66.30; H, 6.57; N, 7.03. Found: C, 66.36; H, 6.83; N, 7.06.

Its structure was further confirmed by NMR, IR and UV spectral analyses.

Example 55

One gram of 1-(2-diethylaminoethylamino)-4-hydroxymethylthioxanthen-9-one and 1 g. of 3,5-dinitrobenzoyl chloride were dissolved in 3 ml. of pyridine and the mixture allowed to stand for ten minutes. The reaction mixture was then poured into about 50 ml. of water. The solid that separated was collected and washed successively with 5% sodium carbonate solution and water, and then recrystallized once from ethyl acetate and once from acetone to yield 0.34 g. of 1-(2-diethylaminoethylamino)-4-hydroxymethylthioxanthen - 9 - one 3,5-dinitrobenzoate, M.P. 144.0–145.0° C. (corr.) with decomposition.

Analysis.—Calcd. for $C_{27}H_{26}N_4O_7S$: N, 10.17; S, 5.82. Found: N, 10.02; S, 5.91.

Example 56

A mixture of 1 g. of 1-(2-diethylaminoethylamino)-4-hydroxymethylthioxanthen-9-one and 2 ml. of phenyl isocyanate was warmed to effect solution. On cooling a crystalline solid separated. n-Hexane was added to remove the excess phenyl isocyanate. The solid was collected and recrystallized twice from acetone to yield 1.0 g. of 1 - (2-diethylaminoethylamino)-4-hydroxymethylthioxanthen-9-one carbanilate, M.P. 165.0–165.6° C. (corr.) with decomposition.

Analysis.—Calcd. for $C_{27}H_{29}N_3O_3S$: N, 8.84; S, 6.74. Found: N, 8.72; S, 6.72.

Example 57

A thiosemicarbazone of a formyl compound was prepared as follows: A mixture containing 1-(2-diethylaminoethylamino)-9-oxo-4-thioxanthenecarboxaldehyde, 90 ml. of ethanol, 2.7 g. of semithiocarbazide, 90 ml. of water and 6 ml. of acetic acid was heated at 70° C. in a water bath for three hours, cooled, neutralized with ammonium hydroxide and then made basic with 10% aqueous sodium hydroxide solution. The resulting precipitate was collected and recrystallized once from methanol and once from pyridine to yield 4.0 g. of 1-(2-diethylaminoethylamino)-9-oxo-4-thioxanthenecarboxaldehyde thiosemicarbazone, M.P. 209.2–211.0° C. (corr.) with decomposition.

Analysis.—Calcd. for $C_{21}H_{25}N_5OS_2$: N, 16.38; S, 15.00. Found: N, 16.12; S, 14.99.

Example 58

A semicarbazone of one of our 4-formyl compounds was prepared as follows: To a solution containing 5 g. of 1 - (2 - diethylaminoethylamino) - 9 - oxo - thioxanthen-4-carboxaldehyde in 100 ml. of ethanol was added a solution containing 2.5 g. of semicarbazide hydrochloride, 3.8 g. of sodium acetate and 50 ml. of water. The reaction mixture was heated on a steam bath for two hours, filtered and then allowed to cool. The filtrate was made basic with 10% aqueous sodium hydroxide solution. The resulting precipitate was collected and recrystallized from dimethylformamide-methanol to yield 4.7 g. of 1-(2-diethylaminoethylamino) - 9 - oxo - thioxanthene - 4 - carboxaldehyde semicarbazone, M.P. 274.0–275.0° C. (corr.) with decomposition.

Analysis.—Calcd. for $C_{21}H_{25}N_5O_2S$: N, 17.02; S, 7.79. Found: N, 17.15; S, 7.93.

Example 59

Following the procedure described in Example 1, 1-(2-diethylaminoethylamino) - 4 - methyl-5,6,7,8-tetrahydrothioxanthen-9-one (14 g. as its hydrochloride) was converted into the corresponding 4-hydroxymethyl and 4-formyl compounds. After one recrystallization from ethyl acetate, there was obtained 2.3 g. of 1-(2-diethylaminoethylamino) - 4 - hydroxymethyl - 5,6,7,8 - tetrahydrothioxanthen-9-one, M.P. 125.6–127.2° C. (corr.).

Analysis.—Calcd. for $C_{20}H_{28}N_2O_2S$: N, 7.77; S, 8.90. Found: N: 7.73; S, 9.23.

Example 60

Following the procedure described in Example 1 with the modification noted below, 1-[2-(2-ethylpiperidino)-ethylamino]-4-methylthioxanthen-9-one (24 g. as its free base) was converted into 1-[2-(2-ethylpiperidino)ethylamino] - 4 - hydroxymethylthioxanthen - 9 - one and 1-[2-(2 - ethylpiperidino)ethylamino]thioxanthen - 9 - one-4-carboxaldehyde. Two 10 liter fermentations were carried out in said soydextrose medium using *Aspergillus sclerotiorum* (SWRI A₂₄), agitation of 450 r.p.m., an air flow of 5 liters per minute and a temperature of 30° C. for twenty-four hours. At the end of this time, 1-[2-

(2 - ethylpiperidino)ethylamino] - 4 - methylthioxanthen-9-one was added in portions of 3–5 g. for a total of 0.8 g. per liter in one tank and 1.6 g. per liter in the other. Approximately seventy hours after the initial substrate addition, the fermentations were terminated and each extracted with two 20 liter portions of methylene dichloride. The combined extracts were reduced to a thick oily residue. Thin layer chromatography of a sample revealed minor quantities of the starting 4-methyl compound and the 4-carboxaldehyde, and the 4-hydroxymethyl product as the major component. Conversion of the 4-carboxaldehyde into the 4-hydroxymethyl compound was accomplished by addition of 500 ml. of methanol and 5 g. of sodium borohydride. The methanol was evaporated off in vacuo and 1000 ml. of benzene was added. The benzene solution was washed with four 500 ml. portions of water and then evaporated in vacuo to remove the benzene. To the thick oily residue was added 150 ml. of ether and the mixture placed in an ice bath. The crystalline material which resulted was collected and recrystallized from isopropyl acetate to yield 14 g. of yellow crystalline 1 - [2 - (2 - ethylpiperidino)ethylamino] - 4 - hydroxymethylthioxanthen - 9 - one, M.P. 91.0–92.0° C. (corr.). The UV and NMR spectra of this compound are consistent with the assigned structure.

*Analysis.*—Calcd. for $C_{23}H_{28}N_2O_2S$: C, 69.66; H, 7.12; S, 8.09. Found: C, 69.61; H, 7.42; S, 7.82.

The intermediate 1 - [2 - (2 - ethylpiperidino) - ethylamino] - 4 - methylthioxanthen - 9 - one was prepared by the following illustrative procedure: A solution containing 7.5 g. of 1-(2 - chloroethylamino) - 4 - methylthioxanthen-9-one, 7.0 g. of 2-ethylpiperidine and 25 ml. of xylene was refluxed for twenty-four hours. The reaction mixture was cooled, chloroform was added, and the reaction mixture was washed with water. The organic phase was separated, dried over anhydrous magnesium sulfate and heated in vacuo to remove the chloroform and xylene. The solid that remained was dissolved in hot acetic acid, the solution was added to several volumes of water, the mixture was filtered through infusorial earth (Super-Cel®), and the filtrate was made basic by addition of 35% aqueous sodium hydroxide solution. The resulting gummy precipitate was collected and dissolved in chloroform. The chloroform solution was washed with water and brine, dried over anhydrous magnesium sulfate, and heated in vacuo to remove the chloroform. The residue crystallized on standing (for three days). The crystalline product was dried at 75° C. overnight to yield 5.85 g. (62%) of 1 - [2 - (2 - ethylpiperidino)ethylamino]-4-methylthioxanthen-9-one, M.P. 48.6–85.8° C. (corr.).

*Analysis.*—Calcd. for $C_{23}H_{28}N_2OS$: N, 7.36; S, 8.43. Found: N, 7.44; S, 8.39.

Example 61

Following the procedure described in Example 60, 6-chloro-1-[2-(N-ethyl - N - 2 - hydroxyethylamino)ethylamino]-4-methylthioxanthen-9-one (12 g. in one 10 liter fermentation) was converted into a mixture of the corresponding 4-formyl and 4-hydroxymethyl compounds, the small proportion of the former being reduced to the latter with sodium borohydride. There was thus obtained 3.0 g. of orange crystalline 6-chloro-1-[2-(N-ethyl-N-2-hydroxyethylamino)ethylamino] - 4 - hydroxymethylthioxanthen-9-one, M.P. 122.8–126.6° C. (corr.).

*Analysis.*—Calcd. for $C_{20}H_{23}ClN_2O_3S$: N, 6.88; S, 7.88. Found: N, 7.03; S, 7.59.

Example 62

Following the procedure described in Example 1 and using two 10 liter fermentations with an air flow of 5 liters per minute, agitation of 450 r.p.m. and a temperature of 30° C., 6-chloro-1-[2-(N-ethyl-N-2-hydroxypropylamino) - ethylamino] - 4 - methylthioxanthen - 9 - one (7 g. as its hydrochloride, at levels of 0.2 g. per liter and 0.5 g. per liter) was converted into its corresponding 4-hydroxymethyl and 4-formyl analogs. There was isolated, after recrystallization from ethyl acetate, 0.60 g. of orange crystalline 6 - chloro - 1 - [2 - (N - ethyl - N - 2 - hydroxypropylamino) - ethylamino] - 4 - hydroxymethylthioxanthen-9-one, M.P. 127.0–130.0° C. (corr.).

*Analysis.*—Calcd. for $C_{21}H_{25}ClN_2O_3S$: Cl, 8.42; N, 6.66. Found: Cl, 8.35; N, 6.75.

Example 63

Following the procedure described in Example 62 and using one 10 liter fermentation at a substrate level of 0.4 g. per liter, 1-[2-(2-hydroxy-2-methylpropylamino) ethylamino]-4-methylthioxanthen-9-one (4.0 g. as its hydrochloride) was converted into its 4-hydroxymethyl and 4-formyl analogs. The former was isolated from the mixture by silica gel column chromatography using an ether gradient in n-hexane and finally a methanol gradient in ether. Later fractions collected at 4–6% methanol in ether (with 1% triethylamine) yielded the 4-hydroxymethyl analog which was crystallized from ethyl acetate to yield 0.34 g. of orange crystalline 4-hydroxymethyl-1-[2 - (2 - hydroxy - 2 - methylpropylamino)ethylamino] thioxanthen-9-one, M.P. 121.6–123.6° C. (corr.).

*Analysis.*—Calcd. for $C_{20}H_{24}N_2O_3S$: N, 7.52; S, 8.61. Found: N, 7.65; S, 8.02.

Example 64

In subsequent runs of the procedure described in Example 1, modifications in the isolation technique yielded minor quantities of 4,4'-oxybis{methylenebis-[1-(2-diethylaminoethylamino)thioxanthen-9-one]}, i.e., the bis ether derivative of 1-(2-diethylaminoethylamino)-4-hydroxymethylthioxanthen-9-one, and 1-(2-diethylaminoethylamino)thioxanthen-9-one-4-carboxylic acid, i.e., the oxidative derivative of the corresponding hereinabove-described 4-carboxaldehyde. These isolations are described, respectively, in Examples 64A and 64B.

A. In a 10 liter run using 6.0 g. per liter of 1-(2-diethylaminoethylamino)-4-methylthioxanthen-9-one hydrochloride, the mycelial fraction was filtered, dried and extracted with acetone. The aqueous phase was extracted with methylene dichloride and the extract was concentrated in vacuo to remove the solvent. The remaining residue was dissolved in 6 liters of benzene and the solution extracted with 12 liters of 0.5N phopshoric acid. The pH of the acid phase was adjusted to 7.0 with 10N aqueous sodium hydroxide solution and extracted with 5 gallons of methylene dichloride. The extract was concentrated in vacuo to remove the solvent and a sample applied to T.L.C. silica gel plate developed in a solvent containing nine parts of ethyl acetate and one part of triethylamine. The major component was slightly more polar ($R_f=0.58$) than the starting 4-methyl compound ($R_f=0.64$) and less polar than the corresponding 4-hydroxymethyl compound ($R_f=0.41$). The residue remaining after evaporation of the methylene dichloride was mixed with 50 g. of silica gel and placed on a 900 g. silica gel column (5 x 73 cm.) and the column was developed with a solvent consisting of 1% methanol and 1% triethylamine in ether, 500 ml. fractions being collected. Fractions 15 and 16 contain the major component; evaporation of these fractions in vacuo to remove the solvent yielded residue which was crystallized from methylene dichloride-n-hexane to yield 0.65 g. of yellow crystalline 4,4' - oxybis{methylenebis[1 - (2 - diethylaminoethylamino)thioxanthen-9-one]}, M.P. 166.0–168.0° C. (corr.), after drying at 100° C. in vacuo over phosphorus pentoxide and paraffin.

*Analysis.*—Calcd. for $C_{40}H_{46}N_4O_3S_2$: N, 8.06; S, 9.22. Found: N, 8.20; S, 9.09.

From the foregoing, it is seen that the phosphoric acid treatment converted 1-(2-diethylaminoethylamino)-4-hydroxymethylthioxanthen-9-one into its corresponding bis ether, which is thus useful as a characterizing derivative of said 4-hydroxymethyl compound.

B. In a 10 liter run using 4.5 g. per liter of 1-(2-diethylaminoethylamino)-4-methylthioxanthen-9- one hydrochloride, the methylene dichloride extract was concentrated to dryness in vacuo. The residual yellow glassy material was slurried with a mixture of 600 ml. of benzene adn 200 ml. of water containing 30 ml. (28%) ammonia solution. A small amount of water and a benzene-insoluble material separated at the interface and was removed by filtration. This substance, which appeared to be a salt of an acid, weighed 2.0 g. and melted above 300° C. When this voluminous substance was dissolved in 100 ml. of boiling 10% acetic acid and the solution was cooled to 50° C., a crystalline precipitate separated. The precipitate was collected and recrystallized from 50 ml. of 95% ethanol to yield 1.0 g. of 1-(2-diethylaminoethylamino) thioxanthen-9-one-4-carboxylic acid, M.P. 127.6–131.0° C. (corr.) with decomposition.

*Analysis.*—Calcd. for $C_{20}H_{22}N_2O_3S$: C, 64.85; H, 5.96; S, 8.16; N.E., 370.4. Found: C, 64.72; H, 6.07; S, 8.18; N.E., 374.9.

The above 4-carboxylic acid is thus useful as a characterizing derivative of the corresponding 4-carboxaldehyde.

The 4-hydroxymethylthioxanthenes and 4-hydroxymethylxanthenes of our invention when administered orally to hamsters infected with *Schistosoma mansoni* were found to clear completely the animals of the parasitic infection at dose levels lower than required for the corresponding 4-methyl compounds. Some of the compounds, e.g., 1-(2-diethylaminoethylamino)-4-hydroxymethylthioxanthen - 9 - one, 1 - [2-(2-methylpiperidino) ethylamino] - 4 - hydroxymethylthioxanthen - 9 - one, 1 - (2 - piperidinoethylamino) - 4 - hydroxymethylthioxanthen - 9 - one, 6 - chloro - 1 - (2 - diethylaminoethylamino) - 4 - hydroxymethylthioxanthen - 9 - one, 1 - (2-diethylaminoethylamino) - 4 - hydroxymethylxanthen - 9-one, 4 - hydroxymethyl - 1 - [2 - (2 - methylpiperidino)-ethylamino]xanthen - 9 - one, 4 - acetoxymethyl - 1 - (2-diethylaminoethylamino)thioxanthen - 9 - one, 6 - chloro-1 - (2 - diethylaminoethylamino) - 4 - hydroxymethylxanthen - 9 - one, 1 - (2 - diethylaminoethylamino) - 4 - hydroxymethylthioxanthen-9-one as its 3,5-dinitrobenzoate, 1 - (2 - diethylaminoethylamino) - 4 - hydroxymethylthioxanthen-9-one as its carbanilate, 1-(2-ethylaminoethylamino) - 4 - hydroxymethylthioxanthen - 9 - one, 1 - (2-diethylaminoethylamino) - 4 - hydroxymethylthioxanthen-9 - one - 10 - oxide, 1 - (2 - diethylaminoethylamino) - 5, 6,7,8 - tetrahydro - 4 - hydroxymethylthioxanthen - 9 - one and 6 - chloro - 1 - [2 - (N - ethyl - N - 2 - hydroxyethylamino)ethylamino] - 4 - hydroxymethylthioxanthen - 9-one, have $ED_{50}$ values below 15 mg. per kg. per day, $ED_{50}$ meaning the effective dose necessary to clear 50% of the hamsters of the infection. These 4-hydroxymethyl compounds were also found to be less toxic than the corresponding 4-methyl compounds. The decrease in toxicity in going from the 4-methyl compounds to the 4-hydroxymethyl compounds is illustrated as follows: The intravenous (i.v.) $LW_{50}$ (in mice) of 1-(2-diethylaminoethylamino) - 4 - hydroxymethylthioxanthen - 9-one was found to be 105±9 mg./kg., compared with an i.v. $LD_{50}$ of 48±3 for the corresponding 4-methyl compound (HCl salt); $LD_{50}$ meaning the dose lethal to 50% of the mice (10 mice tested at each of three dose levels); also, the i.v. $ALD_{50}$ (in mice) of 1-(2-piperidinoethylamino)-4-hydroxymethylthioxanthen-9-one was found to be >100 mg./kg., compared with an i.v. $LD_{50}$ of 52±5 mg./kg. for the corresponding 4-methyl compound (HCl salt), $ALD_{50}$ meaning the approximate dose lethal to 50% of the mice (3 mice tested at each of three dose levels). As illustrative of the schistosomicidal activity of the 4-formyl compounds, 1 - (2 - diethylaminoethylamino)thioxanthen-9-one-4-aldehyde when tested in hamsters as noted above was found to have an $ED_{50}$ approximately the same as that found for its 4-methyl precursor.

We claim:
1. A compound of the formula

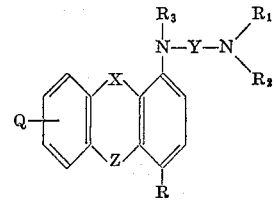

where X is >C=O, >CHOH or >CH$_2$, Z is —O—, —S—, >SO or >SO$_2$, Q is hydrogen or from one to three substituents at positions 5, 6, 7 and 8 of the tricyclic ring selected from halo, lower-alkyl or lower-alkoxy, R is —CH$_2$OH or —CHO, Y is lower-alkylene having from two to four carbon atoms and having its two connecting linkages on different carbon atoms, R$_3$ is hydrogen or lower-alkyl, R$_1$ is hydrogen, lower-alkyl or lower-2-hydroxyalkyl and R$_2$ is lower-alkyl or lower-2-hydroxyalkyl where R$_1$ and R$_2$ taken with N also is piperidino, hexamethyleneimino, pyrrolidino, morpholino, piperazino or lower-alkylated derivatives thereof; or its 5,6,7,8-tetrahydro derivative.

2. 1-(2-diethylaminoethylamino)-4-hydroxymethyl-thioxanthen-9-one.
3. 4-hydroxymethyl-1-[2-(2-methylpiperidino)-ethylamino]thioxanthen-9-one.
4. 4-hydroxymethyl-1-(2-piperidinoethylamino)-thioxanthen-9-one.
5. 6-chloro-1-(2-diethylaminoethylamino)-4-hydroxymethylthioxanthen-9-one.
6. 1-(2-diethylaminoethylamino)thioxanthen-9-one-4-carboxaldehyde.
7. 1-(2-diethylaminoethylamino)-4-hydroxymethylxanthen-9-one.
8. 1-(2-diethylaminoethylamino)-4-hydroxymethyl-thioxanthen-9-one-10,10-dioxide.
9. 4-acetoxymethyl-1-(2-diethylaminoethylamino)-thioxanthen-9-one.
10. 1-(2-ethylaminoethylamino)-4-hydroxymethyl-thioxanthen-9-one.
11. 1-(2-diethylaminoethylamino)-4-hydroxymethylthioxanthen-9-one-10-oxide.
12. 1-(2-diethylaminoethylamino)-5,6,7,8-tetrahydro-4-hydroxymethylthioxanthen-9-one.
13. 4,4'-oxybis{methylenebis[1-(2-diethylaminothylamino)thioxanthen-9-one]}.
14. 1-(2-diethylaminoethylamino)thioxanthen-9-one-4-carboxylic acid.

References Cited by the Examiner
UNITED STATES PATENTS 2,631,154   3/1953   Archer _____ 260—335
2,653,950   9/1953   Archer _____ 260—328

OTHER REFERENCES
Amstutz et al., Journ. Chem. Soc., volume 70, 133-138 (1948).

WALTER A. MODANCE, *Primary Examiner.*

A. D. SPEVACK, *Assistant Examiner.*